United States Patent
Kim et al.

(10) Patent No.: US 10,945,207 B2
(45) Date of Patent: Mar. 9, 2021

(54) BEACON SIGNAL PROCESSING SYSTEM AND FILTERING METHOD OF REDUCING WAKE-UP FREQUENCY

(71) Applicant: FCI Inc., Seongnam-si (KR)

(72) Inventors: Won Man Kim, Seongnam-si (KR); Chang Hwan Park, Seongnam-si (KR)

(73) Assignee: Dialog Semiconductor Korea Inc., Seoul (KR)

( * ) Notice: Subject to any disclaimer, the term of this patent is extended or adjusted under 35 U.S.C. 154(b) by 79 days.

(21) Appl. No.: 16/240,114

(22) Filed: Jan. 4, 2019

(65) Prior Publication Data

US 2019/0215771 A1    Jul. 11, 2019

(30) Foreign Application Priority Data

Jan. 5, 2018   (KR) .......................... 10-2018-0001600

(51) Int. Cl.
*H04W 52/02*   (2009.01)
*H04W 76/28*   (2018.01)

(52) U.S. Cl.
CPC ... *H04W 52/0229* (2013.01); *H04W 52/0216* (2013.01); *H04W 52/0264* (2013.01); *H04W 52/0274* (2013.01); *H04W 76/28* (2018.02)

(58) Field of Classification Search
CPC .. H04W 52/02; H04W 52/0203; H04W 84/12
See application file for complete search history.

(56) References Cited

U.S. PATENT DOCUMENTS

| | | | | |
|---|---|---|---|---|
| 5,444,702 | A * | 8/1995 | Burnett | .................. H04L 49/201 370/254 |
| 6,483,832 | B1 * | 11/2002 | Civanlar | ............. H04L 12/1886 370/390 |
| 6,707,814 | B1 * | 3/2004 | Ohgane | ............... H04L 12/4608 370/389 |
| 9,072,101 | B2 * | 6/2015 | Walton | .................. H04W 74/06 |
| 9,112,717 | B2 * | 8/2015 | Klein | ...................... H04L 12/12 |
| 2005/0265398 | A1 * | 12/2005 | Chapman | ............ H04L 12/1859 370/509 |
| 2006/0114866 | A1 * | 6/2006 | Kim | ...................... H04W 16/14 370/338 |
| 2007/0286121 | A1 * | 12/2007 | Kolakowski | ...... H04L 29/06027 370/329 |
| 2008/0049703 | A1 * | 2/2008 | Kneckt | ................. H04W 68/00 370/342 |
| 2008/0232270 | A1 * | 9/2008 | Fleming | .................. H04L 12/12 370/254 |

(Continued)

FOREIGN PATENT DOCUMENTS

CN     101321072 B    1/2013
CN     102209303 B    6/2014

*Primary Examiner* — Hassan A Philiips
*Assistant Examiner* — Prenell P Jones
(74) *Attorney, Agent, or Firm* — Saile Ackerman LLC; Stephen B. Ackerman

(57) ABSTRACT

A beacon signal processing system of reducing wake-up frequency periodically receives a beacon signal from an access point. The beacon signal processing system, according to a data transfer type of a traffic indication message contained in the beacon signal, maintains a sleep mode or only wakes up part of modules of hardware and software necessary for communication for processing.

17 Claims, 7 Drawing Sheets

(56) References Cited

U.S. PATENT DOCUMENTS

| | | | |
|---|---|---|---|
| 2009/0103435 A1* | 4/2009 | Celentano | H04W 52/0251 370/232 |
| 2009/0168939 A1* | 7/2009 | Constantinidis | H04W 52/028 375/359 |
| 2010/0110930 A1* | 5/2010 | Kohvakka | H04W 56/0025 370/254 |
| 2010/0153760 A1* | 6/2010 | Gupta | G06F 13/385 713/323 |
| 2010/0329232 A1* | 12/2010 | Tubb | E05B 39/00 370/345 |
| 2011/0149960 A1* | 6/2011 | Fernandez Gutierrez | H04L 45/16 370/390 |
| 2011/0219414 A1* | 9/2011 | Guo | H04N 21/6125 725/109 |
| 2014/0233446 A1* | 8/2014 | Fanfelle | H04W 4/06 370/312 |
| 2014/0293958 A1* | 10/2014 | Teyeb | H04W 36/0072 370/331 |
| 2015/0063111 A1* | 3/2015 | Merlin | H04L 5/0037 370/235 |
| 2015/0131462 A1* | 5/2015 | Puranik | H04W 52/0212 370/252 |
| 2015/0312953 A1* | 10/2015 | Wang | H04L 1/00 370/312 |
| 2015/0381322 A1* | 12/2015 | Homchaudhuri | H04W 52/0245 370/242 |
| 2016/0011651 A1* | 1/2016 | Nychka | G11C 11/4074 713/323 |
| 2016/0157164 A1* | 6/2016 | Lee | H04W 48/16 370/329 |
| 2016/0272019 A1* | 9/2016 | Wang | B60C 23/0486 |
| 2016/0330688 A1* | 11/2016 | Kukosa | H04W 52/0274 |
| 2018/0184379 A1* | 6/2018 | Liu | H04W 52/0219 |
| 2018/0184435 A1* | 6/2018 | Cariou | H04W 36/0061 |
| 2018/0359705 A1* | 12/2018 | Kukosa | H04W 52/0274 |
| 2018/0365454 A1* | 12/2018 | Ro I | G06Q 30/02 |
| 2019/0028967 A1* | 1/2019 | Ahn | H04B 7/02 |
| 2019/0260813 A1* | 8/2019 | Millington | H04W 48/18 |
| 2020/0153652 A1* | 5/2020 | Petrovic | H04L 43/0811 |

* cited by examiner

BEACON SIGNAL PROCESSING SYSTEM AND FILTERING METHOD OF REDUCING WAKE-UP FREQUENCY

RELATED APPLICATIONS

This application claims priority benefit of Korean Patent Application No. 10-2018-0000160 filed Jan. 5, 2018, of which is hereby incorporated by reference in its entirety.

BACKGROUND OF INVENTION

1. Field of Invention

The present invention relates to a beacon signal processing system and a filtering method of reducing wake-up frequency.

2. Related Art

The following descriptions do not constitute the related art and provides only background information related to embodiments of the present invention.

Generally, a power management module of a 802.11 wireless local area network (WLAN), in an active mode, enters a sleep mode when there is no data to be received.

In the sleep mode, the power management module checks data contained in periodically transmitted beacon frames, as a traffic indication message (TIM) or a delivery traffic indication message (DTIM), to determine whether there is data to be received. If a checking result indicates that there is data to be received, the power management module changes the sleep mode to an active mode transmitting power save-poll (PS-Poll) and receiving data. If the check result indicates that there is no data to be received, the sleep mode remains the same.

Generally, to reduce and minimize power consumption, the power management module attempts to enter the sleep mode in the 802.11 WLAN. Normally, in order to enter in the active mode from the sleep (doze) mode, power consumption in each stage of the power management module in the 802.11 WLAN is produced by performing a main application program.

The power management module of the 802.11 WLAN is generally carried in a main application program for services of all functions. Specifically, the main application program contains data and codes not only necessary for a check of the TIM/DTIM but also for associated services. Furthermore, the main application program needs to initiate the associated services, thereby increasing unnecessary initiation time, and hardware modules working in conjunction with the associated services are thus in a power-on state producing unnecessary power consumption.

SUMMARY OF INVENTION

An object of the present invention is to provide a beacon signal processing system and a filtering method of reducing wake-up frequency. The beacon signal processing system periodically receives a beacon signal and maintains a sleep mode or only wakes up part of modules of hardware and software necessary for communication.

To achieve the above-mentioned object, the beacon signal processing system comprises a memory and a processor, wherein a beacon receiver program containing computerized instructions is stored in the memory and configured to be executed by the processor to perform a method, the method comprising: periodically receiving, by a beacon receiver, a beacon signal from an access point; identifying an information element of data contained in the beacon signal; identifying a data transfer type of a traffic indication message contained in the information element; identifying whether the data contained in the beacon signal is necessary data according to the data transfer type; and operating in a sleep mole or an active mode according to whether or not the data contained in the beacon signal is necessary data.

The filtering method of reducing wake-up frequency, adapted for an electronic device, comprises: periodically receiving a beacon signal from an access point; identifying an information element of data contained in the beacon signal; identifying a traffic indication message contained in the information element, and identifying a data transfer type of the traffic indication message; identifying whether data contained in the beacon signal is necessary data according to the data transfer type; and operating in a sleep mode or an active mode according to whether or not the data contained in the beacon signal is necessary data.

The present invention has advantages as follows: the beacon signal processing system, according to a data transfer type of a traffic indication message contained in the beacon signal, maintains a sleep mode or only wakes up part of modules of hardware and software necessary for communication in order to reduce power consumption of a station and workload of hardware and software for processing data.

DESCRIPTION OF PREFERRED EMBODIMENTS

Figure 1:
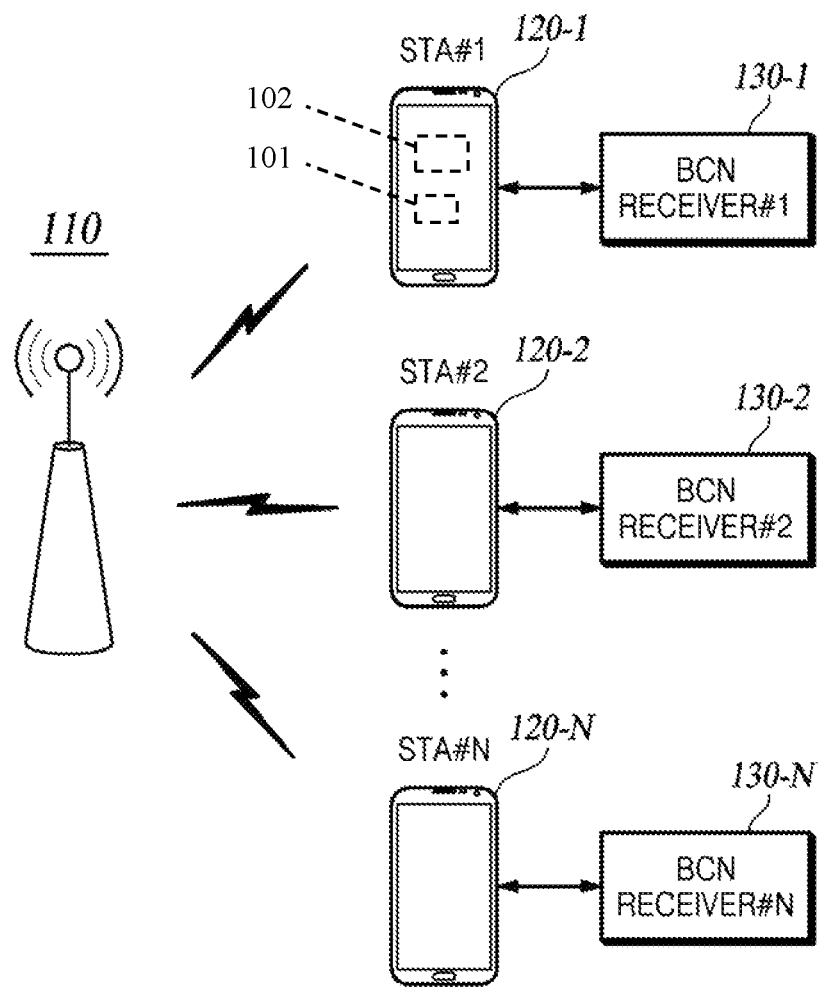
FIG. 1 is a schematic block diagram showing a filtering system for reducing wake-up frequency in accordance with an embodiment of the present invention.

FIG. 1 is a schematic block diagram showing a filtering system for reducing wake-up frequency in accordance with an embodiment of the present invention. The filtering system for reducing wake-up frequency comprises an access point 110 and a station (STA) 120-1, a STA 120-2, a STA 120-3, but is not limited thereto. The access point 110 periodically transmits a beacon signal containing data to maintain network connectivity with the STAs 120-1, 120-2, and 120-3 within a coverage range. Preferably, the access point 110 is driven a power source received from other power supply device, but is not limited thereto. Alternatively, the power supply device is exemplified by a battery.

The beacon signal containing data for maintaining network connectivity and transmitted by the access point 110 represents a data transfer type in the beacon signal which is to be transmitted to a traffic indication message before the beacon signal is transmitted to the STA 120-1, 120-2, 120-N. The traffic indication message is the data transfer type and comprises messages of broadcast (BC), multicast (MC), unicast (UC), and the like.

Wireless local area network (WLAN) network technology and a broadband network access can be widely deployed in a family. WLAN network technology is generally wireless fidelity (Wi-Fi). A WLAN device (usually refers to a station, or STA for short) connected with WLAN network is generally driven by a sleep mode reducing power consumption.

Generally, the STA 120-1, 120-2, 120-N in WLAN needs to be woken up to process a beacon signal after receiving the beacon signal from an access point. The STA 120-1, 120-2, 120-N in accordance with the embodiment of the present invention is awake only when the beacon signal received contains necessary data. The STA 120-1, 120-2, 120-N in a sleep mode identifies whether data contained in the beacon signal received from the access point 110 is necessary data, and is thus selectively being woken up.

The STA 120-1, 120-2, 120-N, operating in the sleep mode, periodically receives the beacon signal from the access point 110 to conserve power of a battery being purchased. Conventionally, only a processor for calculating and controlling is turned off when the STA 120-1, 120-2, 120-N operates in the sleep mode. But in accordance with the embodiment of the present invention, all of hardware and software necessary for communication with the access point 110 are turned off when the STA 120-1, 120-2, 120-N operates in the sleep mode.

The STA 120-1, 120-2, 120-N, operating in the sleep mode, is required to be changed to a wake-up state in order to communicate with the access point 110. The STA 120-1, 120-2, 120-N performs actions of communicating with the access point 10 and a frame, or receiving or channel scanning and the like when being changed from the sleep mode the wake-up state.

The STA 120-1, 120-2, 120-N, when being in a state of not having communication with the access point 110, enters in the sleep mode to reduce power consumption to conserve power. The STA 120-1, 120-2, 120-N update network information after receiving a beacon signal from the access point 110 so as to be capable of successfully communicating with the access point 110.

The beacon signal from the access point 110 is periodically transmitted, but is not regularly changed. Even being changed, the beacon signal still can be an information element (IE) necessary for a non-beacon system. A general beacon system is required to update network information upon receiving a beacon signal each time.

The STA 120-1, 120-2, 120-N is defined as an electronic device for communication with the access point 110. The STA 120-1, 120-2, 120-N comprises a memory 101 stored with a program or protocol utilized to communicate with the access point 110, and a processor 102 utilized to execute corresponding programs to perform calculating and controlling (as shown in FIG. 1). The STA 120-1, 120-2, 120-N can be a smart phone, a tablet, a laptop, a personal computer (PC), a personal digital assistant (PDA), a gaining machine, a portable multimedia player, a wireless communication terminal, a TV, or a media player.

The STA 120-1, 120-2, 120-N comprises (i) communication apparatus such as communication demodulator for communicating with various devices or wireless networks (ii) a memory for storing various programs and data (iii) a processor and the like for executing programs to perform calculating and controlling. In at least one embodiment, the memory can be a computer readable recording/storage medium, such as a random access memory (RAM), a read only memory (ROM), a flash memory, an optical disk, a magnetic disk, or a solid state disk (SSD), and the like. In at least one embodiment, the processor may be programmed to selectively perform more than one of the actions and functions described in the specification. In at least one embodiment, the processor is exemplified by hardware such as a whole or a specific partial structure of an application specific integrated circuit (ASIC).

The memory is stored with related data and programs. A processor retrieves and processes the related data from the memory. One processor is capable of performing various functions as described above, or multiple processors are utilized to perform the functions in such a way to share a workload. The processor can be exemplified by a general-purpose processor, but also can be exemplified by chips specifically designed for performing the functions.

A beacon receiver program 130 is stored in the memory of the station exemplified by the electronic device. Specifically, a beacon receiver program 130-1, 130-2, 130-N is stored in the memory of the STA 120-1, 120-2, 120-N. The STA 120-1, 120-2, 120-N utilizes the beacon receiver program 130-1, 130-2, 130-N to periodically receive the beacon signal from the access point 110, and determines whether to change the sleep mode to the wake-up state according to the beacon signal received.

The STA 120-1, 120-2, 120-N utilizes the beacon receiver program 130-1, 130-2, 130-N to identify the data transfer type contained in the beacon signal periodically received from the access point 110. The STA 120-1, 120-2, 120-N utilizes the beacon receiver program 130-1, 130-2, 130-N to change the sleep mode to the wake-up state according to the data transfer type contained in the beacon signal.

The STA 120-1, 120-2, 120-N periodically receives the beacon signal form the access point 110. The STA 120-1, 120-2, 120-N utilizes the beacon receiver program 130-1, 130-2, 130-N to identify an information element (IE) contained in the beacon signal in order to identify whether data contained in the beacon signal is necessary data needed to be processed.

The STA 120-1, 120-2, 120-N utilizes the beacon receiver program 130-1, 130-2, 130-N to identify a traffic indication message in the information element.

The STA 120-1, 120-2, 120-N is being woken up when the data transfer type of the traffic indication message identified by the beacon receiver program 130-1, 130-2, 130-N contains a broadcast (BC) flag, a multicast (MC) flag, or a unicast (UC) flag.

The STA 120-1, 120-2, 120-N is being woken up by the beacon receiver program 130-1, 130-2, 130-N and then receives data from the access point 110. The STA 120-1, 120-2, 120-N utilizes the beacon receiver program 130-1, 130-2, 130-N to identify whether data contained in the beacon signal received from the access point 110 is necessary data. The data which is not necessary is abandoned, and the STA 120-1, 120-2, 120-N operates in the sleep mode.

The STA 120-1, 120-2, 120-N does not identify whether the beacon signal contains data for maintaining network connectivity, but to identify whether the beacon signal contains effective data in the element information. The effective data contains data for maintaining network connectivity and necessary data needed for users.

The STA 120-1, 120-2, 120-N utilizes the beacon receiver program 130-1, 130-2, 130-N to identify again whether the effective data is necessary data or unnecessary data. When the effective data is identified as the necessary data, part or all of modules of hardware and software necessary for communication are processed to enter the wake-up state.

When the STA 120-1, 120-2, 120-N utilizes the beacon receiver program 130-1, 130-2, 130-N to identify a data transfer type of a beacon signal as BC, MC, or UC, the data contained in the beacon signal is identified as effective data.

When the STA 120-1, 120-2, 120-N utilizes the beacon receiver program 130-1, 130-2, 130-N to identify that a data transfer type of a beacon signal is unicast, it is determined whether the data contained in the beacon signal is IP data or other data.

The STA 120-1, 120-2, 120-N utilizes the beacon receiver program 130-1, 130-2, 130-N to periodically receive a beacon signal form the access point 110. The STA 120-1, 120-2, 120-N utilizes the beacon receiver program 130-1, 130-2, 130-N to identify an information element (IE) contained in the beacon signal. The STA 120-1, 120-2, 120-N utilizes the beacon receiver program 130-1, 130-2, 130-N to identify a data transfer type of a traffic indication message contained in the IE. The STA 120-1, 120-2, 120-N utilizes the beacon receiver program 130-1, 130-2, 130-N to identify whether the data transfer type of the traffic indication message is broadcast or multicast.

After identification, when the data transfer type of the traffic indication message is broadcast or multicast, the STA 120-1, 120-2, 120-N utilizes the beacon receiver program 130-1, 130-2, 130-N to identify data of broadcast (BC)/multicast (MC) contained in the beacon signal, and the STA 120-1, 120-2, 120-N is woken up to wait to receive data from the access point 110.

The STA 120-1, 120-2, 120-N utilizes the beacon receiver program 130-1, 130-2, 130-N to identify whether a data transfer type of the traffic indication message is unicast. After identification, when the data transfer type of the traffic indication message is unicast (UC), the STA 120-1, 120-2, 120-N utilizes the beacon receiver program 130-1, 130-2, 130-N to identify an association identification (AID) in the traffic indication message. When the association ID is identified as an AID of a corresponding STA, the STA 120-1, 120-2, 120-N receives data from the access point 110 in a unicast form.

BC IP, MC IP, or UC IP data is not additionally identified in the data of the unicast form received from a media access control (MAC) address of the corresponding STA through the beacon receiver program 130-1, 130-2, 130-N of the STA 120-1, 120-2, 120-N. In other words, there is unnecessary data still contained in the BC/MC IP data.

When a data transfer type is broadcast (BC) or multicast (MC), the data transfer types contain a same flag. When the data transfer type is a BC/MC beacon signal, most of the data contains more unnecessary data.

When a data transfer type received by the STA 120-1, 120-2, 120-N is a BC/MC beacon signal (BCN), the STA 120-1, 120-2, 120-N is woken up to receive data from a corresponding BCN.

The STA 120-1, 120-2, 120-N identifies whether data received is necessary data. When the data is identified as unnecessary data, the STA 120-1, 120-2, 120-N operates in the sleep mode. When the data is identified as necessary data, the STA 120-1, 120-2, 120-N operates in an active mode.

When the STA 120-1, 120-2, 120-N identifies that a data transfer type of a beacon signal is unicast data, it is determined whether the unicast data is IP data or other data. For example, when the data transfer type of the beacon signal is other data, a corresponding beacon signal contains more unnecessary data with respect to the STA 120-1, 120-2, 120-N. In other words, the other data contains more data which is only required to be responded with an acknowledge (ACK) without additional processing after being received by the STA 120-1, 120-2, 120-N. For example, the other data contains data for identifying whether the STA connecting with the access point 110 exists.

The access point 110 periodically transmits a beacon signal containing data for identifying whether the STA 120-1, 120-2, 120-N exists. The STA 120-1, 120-2, 120-N only needs to respond with an ACK after receiving the corresponding beacon signal, and therefore maintain communication with the access point 110. When receiving no response from the STA 120-1, 120-2, 120-N, the access point 110 determines that there exists no STA based on preset conditions and deletes data about the STA. The network of the STA is disconnected.

When the data transfer type of the beacon signal is other data, the STA 120-1, 120-2, 120-N only needs to respond with an ACK and operates in the sleep mode. In other words, when the STA 120-1, 120-2, 120-N operates in the sleep mode right after responding with the ACK, there is no need to enable full software or full hardware to work, thereby to maintain operation in a low power state.

For example, when the data transfer type of a beacon signal is IP data, a corresponding beacon signal contains more necessary data with respect to the STA 120-1, 120-2, 120-N. In other words, the IP data contains more data which is necessary for programs of the STA 120-1, 120-2, 120-N. Even if the data transfer type of the beacon signal is IP data, the STA 120-1, 120-2, 120-N operates in the sleep mode when data contained in the beacon signal is identified as unnecessary data for programs by the STA 120-1, 120-2, 120-N.

The STA 120-1, 120-2, 120-N identifies whether a beacon signal received from the access point 110 is necessary data or unnecessary data according to an information element.

Figure 2A:
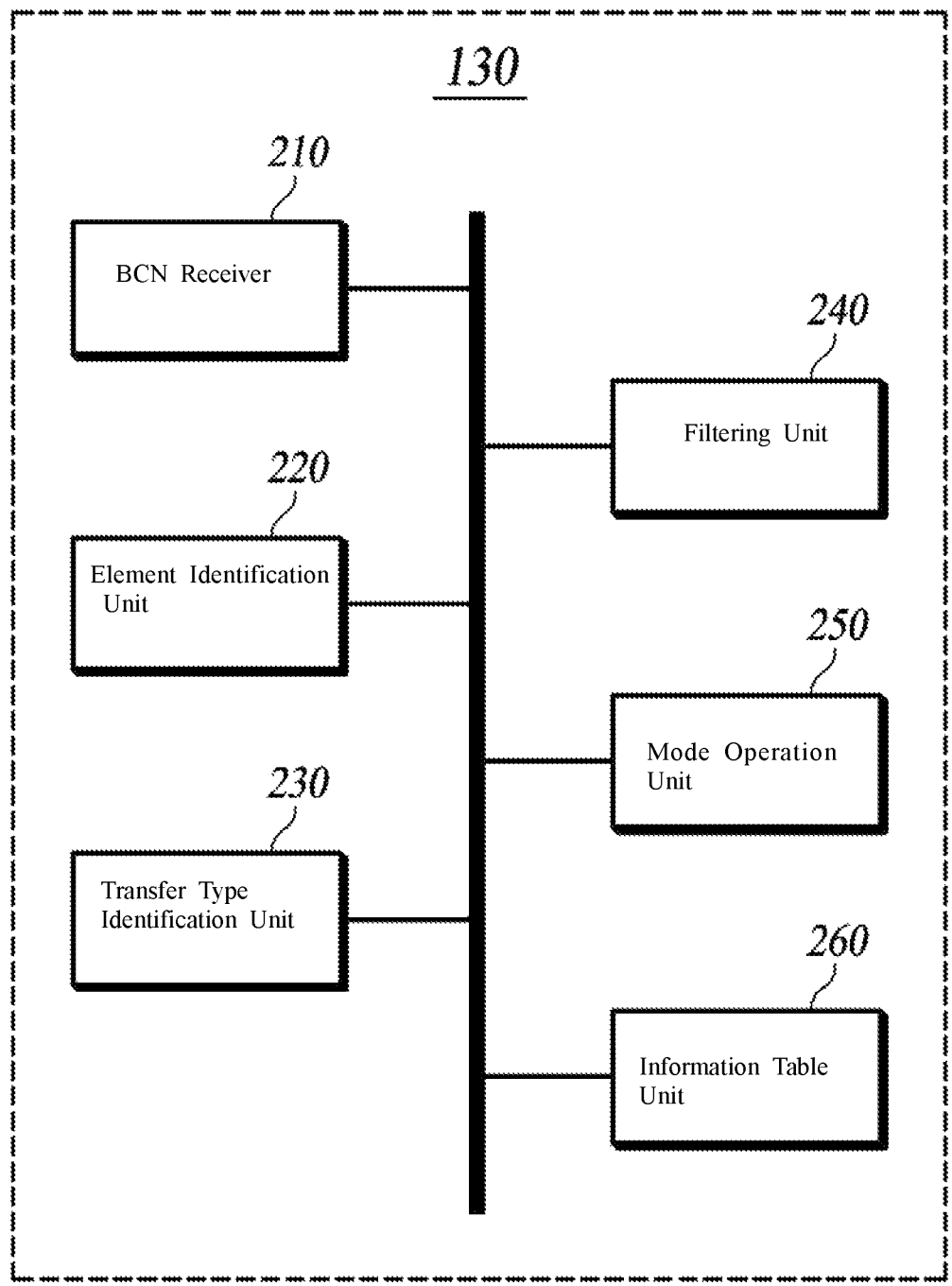
FIGS. 2A and 2B both show schematic block diagrams of a beacon receiver program of the present invention.
Figure 2B:
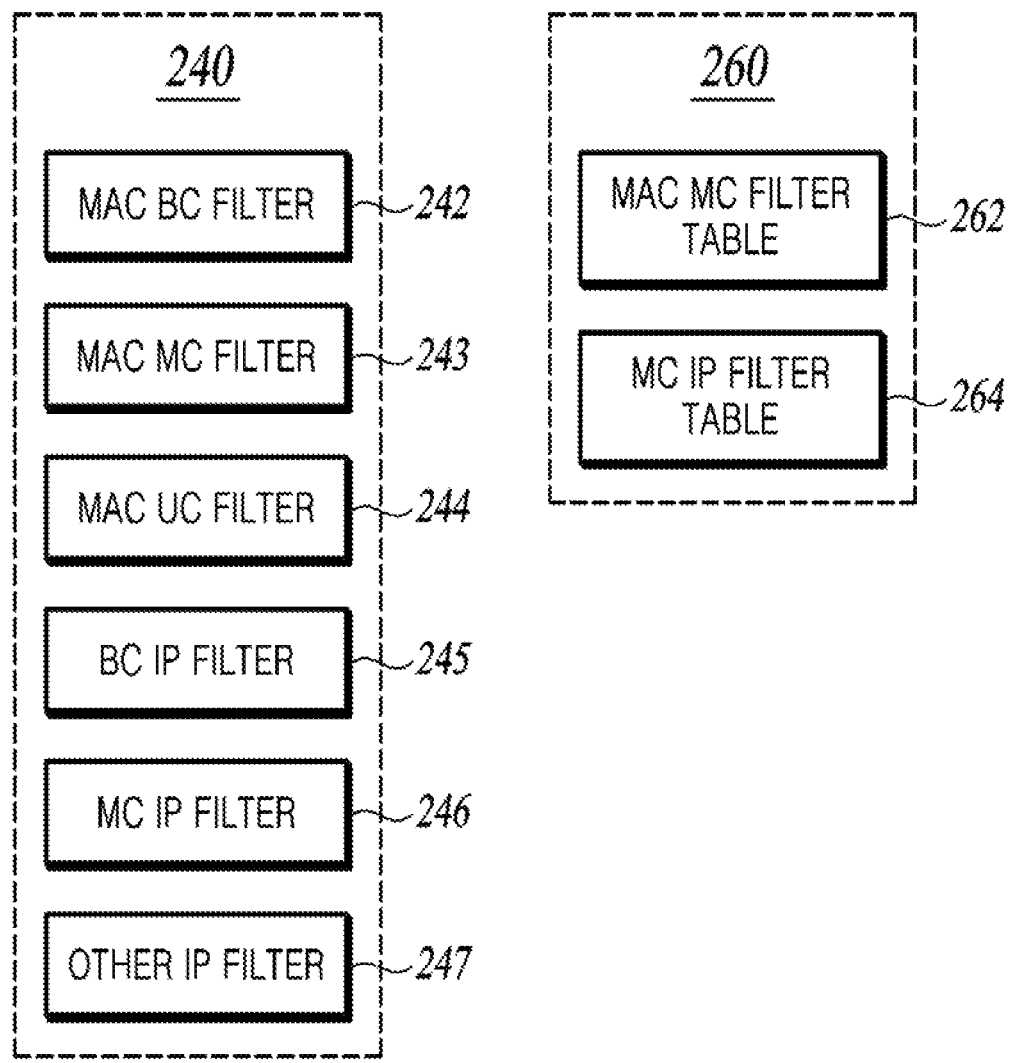

FIGS. 2A and 2B both show schematic block diagrams of a beacon receiver program of the present invention. The beacon receiver program 130-1, 130-2, 130-N in accordance with the embodiment of the present invention comprises a beacon receiver 210, an element identification unit 220, a transfer type identification unit 230, a filtering unit 240, a mode operation unit 250, and an information table unit 260. However, constituent elements contained in the beacon receiver program 130-1, 130-2, 130-N are not limited thereto.

The beacon receiver program 130-1, 130-2, 130-N is exemplified by not only software modules but also hardware modules, as well as a filtering apparatus for reducing wake-up frequency.

Communication paths among the constituent elements contained in the beacon receiver program 130-1, 130-2, 130-N and software modules or hardware modules in a connecting device are coupled for mutual communication.

Each of the constitute elements of the beacon receiver program 130-1, 130-2, 130-N as shown in FIG. 2A is defined as a unit for processing at least a function or action, and can be exemplified by a software module, a hardware module, or a combination of the software and hardware modules.

The beacon receiver 210 periodically receives a beacon signal from the access point 110. The element identification unit 220 identifies an information element of data contained in the beacon signal.

The transfer type identification unit 230 processes a traffic indication message contained in the beacon signal. The transfer type identification unit 230 identifies a data transfer type marked by the traffic indication message in the beacon signal. The transfer type identification unit 230 identifies both the traffic indication message contained in the information element and a data transfer type of the traffic indication message.

The filtering unit 240 identifies whether data contained in the beacon signal is necessary data according to the data transfer type according to the data transfer type. When the data transfer type is corresponding to a specific data transfer type, the filtering unit 240 identifies the data is necessary data.

The filtering unit 240 identifies a flag of the data transfer type, and identifies whether a flag of the data transfer type is a broadcast flag, a multicast flag, or a unicast flag. After identification, when the flag of the data transfer type is the broadcast flag, the multicast flag, or the unicast flag, the data contained is identified by the filtering unit 240 as the effective data corresponding to the specific data transfer type.

When the data transfer type has the broadcast flag/the multicast flag, the filtering unit 240 utilizes a media access control (MAC) broadcast filter 242 to identify whether data with the broadcast flag/the multicast flag is unnecessary data.

When data transfer type has the broadcast flag/the multicast flag, the filtering unit 240 utilizes a MAC multicast filter 243 to identify whether data with the broadcast flag/the multicast flag is unnecessary data.

When the data transfer type has the unicast flag, the filtering unit 240 utilizes a MAC unicast filter 244 to identify whether data with the unicast flag is unnecessary data.

When the data with the unicast flag is not filtered by the MAC unicast filter 244, the filtering unit 240 identifies that the data with the unicast flag is necessary data and further identifies whether the unicast flag is a broadcast/multicast Internet protocol (IP) flag or other flags. After identification, when the unicast flag is identified as not the IP flag or the other flags, the data with the unicast flag is identified as the effective data.

When the data with the unicast flag has the broadcast/multicast IP flag, the filtering unit 240 utilizes a broadcast IP filter 245 to identify whether the data with the broadcast/multicast IP flag is unnecessary data.

When the data with the unicast flag has the broadcast/multicast IP flag, the filtering unit 240 utilizes a multicast IP filter 246 to identify whether the data with the broadcast/multicast IP flag is unnecessary data.

The filtering unit 240 utilizes an other IP filter 247 to identify whether the data with the unicast flag is unnecessary data.

The filtering unit 240 comprises the media access control (MAC) broadcast (BC) filter 242, the MAC multicast (MC) filter 243, the MAC unicast (UC) filter 244, the broadcast IP filter 245, the multicast IP filter 246, and the other IP filter 247.

The filtering unit 240 is utilized to enable or disable filtering elements of each of the filters comprising the MAC BC filter 242, the MAC MC filter 243, the MAC UC filter 244, the BC IP filter 245, the MC IP filter 246, and the other IP filter 247.

The filtering elements of each of the filters are optionally determined. In other words, the filtering elements are determined by an administrator in a development state or during a period of actual system operation. For example, a filtering element of MC data can be a MAC address. Each of the filters registers necessary data for filtering.

The MAC BC filter 242, the MAC MC filter 243, the MAC UC filter 244, the BC IP filter 245, the MC IP filter 246, and the other IP filter 247 maintain data storage in data storage area after entering the sleep mode.

The MAC broadcast filter 242 is a data filter to identify whether data input is necessary MAC broadcast data, and to filter unnecessary MAC broadcast data. The MAC broadcast filter 242 is provided to filter unnecessary MAC broadcast data.

The MAC multicast filter 243 is a data filter to identify whether data input is necessary MAC multicast data, and to filter unnecessary MAC multicast data. The MAC multicast filter 243 is provided to filter unnecessary MAC multicast data.

The MAC unicast filter 244 is a data filter to identify whether data input is necessary MAC unicast data, and to filter unnecessary MAC unicast data. The MAC unicast filter 244 is provided to filter unnecessary MAC unicast data and reduce wake-up frequency of a system.

The broadcast IP filter 245 is a data filter to identify whether data input is necessary broadcast IP data, and to filter unnecessary broadcast IP data. The broadcast IP filter 245 is provided to filter unnecessary broadcast IP data.

The multicast IP filter 246 is a data filter to identify whether data input is necessary multicast IP data, and to filter unnecessary multicast IP data. The multicast IP filter 246 is provided to filter unnecessary multicast IP data.

The broadcast IP filter 245 and the multicast IP filter 246 are capable of filtering unnecessary IP data of the unicast to reduce wake-up frequency of the system.

The other IP filter 247 is a data filter to identify other IP. The other IP filter 247 is provided to filter other IP.

The mode operation unit 250 operates in a sleep mole or an active mode according to whether data contained in the beacon signal is necessary data.

When the data with the broadcast flag/the multicast flag is filtered by the MAC broadcast filter 242, the mode operation unit 250 operates in the sleep mode turning off part or all of modules of hardware and software necessary for communication with the access point 110.

When the data with the broadcast flag/the multicast flag is not filtered by the MAC broadcast filter 242, the mode operation unit 250 operates in the active mode turning on part or all of modules of hardware and software necessary for communication with the access point 110.

When the data with the broadcast flag/the multicast flag is filtered by the MAC multicast filter 243, the mode operation unit 250 operates in the sleep mode turning off part or all of modules of hardware and software necessary for communication with the access point 110.

When the data with the broadcast flag/the multicast flag is not filtered by the MAC multicast filter 243, the mode operation unit 250 operates in the active mode turning on part or all of modules of hardware and software necessary for communication with the access point 110.

When the data with the unicast flag is filtered by the MAC multicast filter 243, the mode operation unit 250 operates in the sleep mode turning off part or all of modules of hardware and software necessary for communication with the access point.

When the data with the broadcast/multicast IP flag is filtered by the broadcast IP filter 245, the mode operation unit 250 operates in the sleep mode turning off part or all of modules of hardware and software necessary for communication with the access point 110.

When the data with the broadcast/multicast IP flag is not filtered by the broadcast IP filter, the mode operation unit 250 operates in the active mode turning on part or all of modules of hardware and software necessary for communication with the access point 110.

When the data with the broadcast/multicast IP flag is filtered by the multicast IP filter 246, the mode operation unit 250 operates in the sleep mode turning off part or all of modules of hardware and software necessary for communication with the access point 110.

When the data with the broadcast/multicast IP flag is not filtered by the multicast IP filter 246, the mode operation unit 250 operates in the active mode turning on part or all of modules of hardware and software necessary for communication with the access point 110.

When the data with the unicast IP flag is filtered by the other IP filter 247, the mode operation unit 250 operates in the sleep mode turning off part or all of modules of hardware and software necessary for communication with the access point 110.

When the data with the unicast IP flag is not filtered by the other IP filter 247, the mode operation unit 250 operates in the active mode turning on part or all of modules of hardware and software necessary for communication with the access point 110.

The information table unit 260 stores a MAC multicast filter table 262 and a multicast IP filter table 264. The MAC multicast filter table 262 stores a table capable of identifying whether the system is necessary MAC multicast data. The multicast IP filter table 264 stores a table capable of identifying whether the system is necessary MAC multicast IP data.

Figure 3:
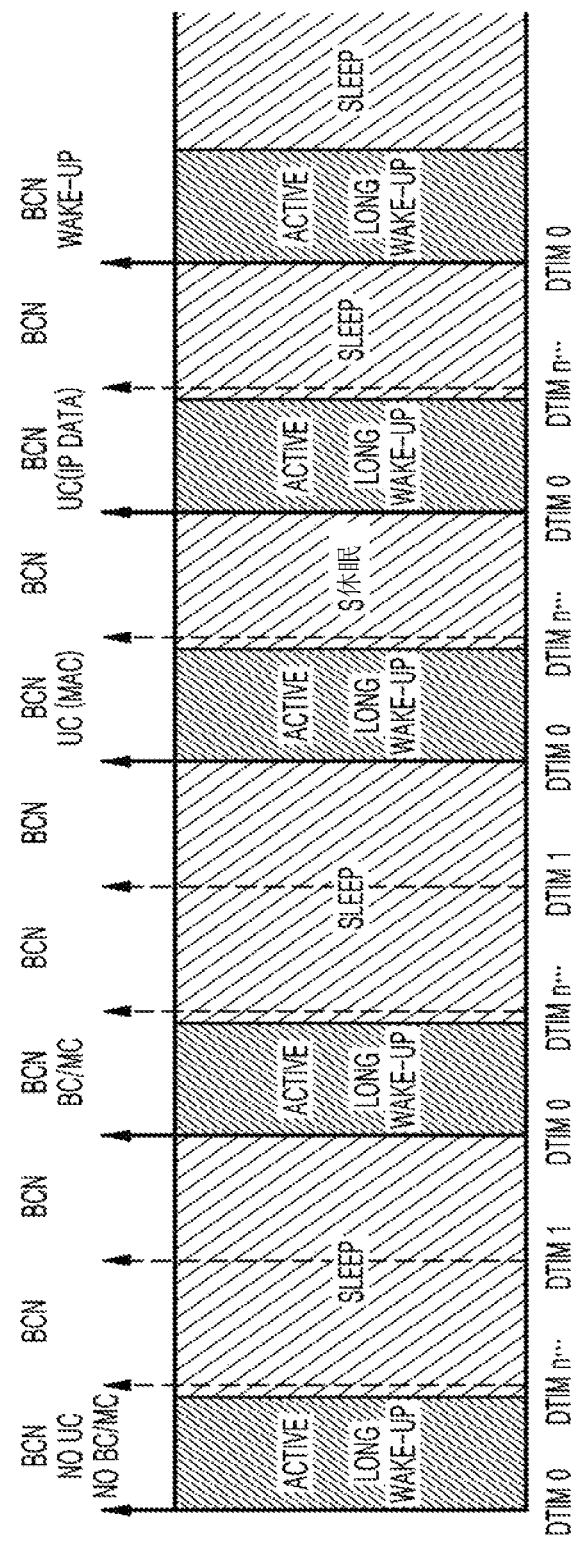
FIG. 3 is a diagram showing whether to wake up according to a beacon signal periodically transmitted.

FIG. 3 is a diagram showing whether to wake up according to a beacon signal periodically transmitted. The STA 120-1, 120-2, 120-N utilizes the beacon receiver program 130-1, 130-2, 130-N to identify a traffic indication message of a beacon signal received from the access point 110 in a predetermined period.

The STA 120-1, 120-2, -N to wake up and receive data for processing 120-N utilizes the beacon receiver program 130-1, 130-2, 130 when the data transfer type of the traffic indication message contained in the beacon signal is broadcast/multicast or unicast.

When the data transfer type of the beacon signal received by the STA 120-1, 120-2, 120-N from the access point 110 is unicast, data needs to be transmitted to a MAC address of a corresponding STA. Therefore, there is no need to identify the broadcast IP data, the multicast IP data, or the unicast IP data processed by the STA 120-1, 120-2, 120-N.

The STA 120-1, 120-2, 120-N does not identify the data to be processed with the broadcast IP data, the multicast IP data, or the unicast IP because the STA 120-1, 120-2, 120-N is woken up to process unnecessary broadcast/multicast data.

The STA 120-1, 120-2, 120-N is woken up to process data contained in the beacon signal received from the access point 110, wherein the data is unnecessary broadcast IP data and multicast IP data of the unicast data transfer type.

The beacon receiver program 130-1, 130-2, 130-N is not frequently awake. As shown in FIG. 3, they are woken up only for necessary in a predetermined awake period.

The STA 120-1, 120-2, 120-N periodically receives a beacon signal from the access point 110, and determines whether to enter a wake-up state from a sleep mode according to the beacon signal received.

The STA 120-1, 120-2, 120-N identifies a data transfer type contained in a beacon signal periodically received from the access point 110. The STA 120-1, 120-2, 120-N is changed from a sleep mode to a wake-up state according to the data transfer type contained in the beacon signal.

Processes of operation of the STA 120-1, 120-2, 120-N are described as follows.

To process data according to the data transfer type contained in the beacon signal, the STA 120-1, 120-2, 120-N utilizes the beacon receiver program 130-1, 130-2, 130-N to change part or all of modules of hardware and software of the STA 120-1, 120-2, 120-N necessary for communication to the wake-up state.

The STA 120-1, 120-2, 120-N analyzes and interprets necessary information necessary for beacon communication in the data contained in the beacon signal, and responds in a beacon communication processing process.

The STA 120-1, 120-2, 120-N identifies an information element contained in the beacon signal received from the access point 110.

The STA 120-1, 120-2, 120-N identifies a traffic indication message of the information element, and selectively wakes up corresponding hardware and software when the data transfer type corresponds to a wake-up condition of an active mode.

The access point 110 periodically transmits a beacon signal to the STA 120-1, 120-2, 120-N within a coverage range.

In the event that the data contained in the beacon signal periodically transmitted from the access point 110 is frequently changed, the STA 120-1, 120-2, 120-N needs to process the data contained in the beacon signal frequently changed, thereby resulting in an additional workload for the STA 120-1, 120-2, 120-N.

Generally, when an STA receives data contained in a beacon signal from the access point 110 which is not necessary for communication with the access point 110, and the STA identifies the data received is changed, the STA is still changed to a wake-up state to work even when the data received is not necessary information.

In the embodiment of the present invention, the STA 120-1, 120-2, 120-N utilizes the beacon receiver program 130-1, 130-2, 130-N to identify whether the information element is unnecessary information element according to the data transfer type contained in the beacon signal, and therefore operates in the sleep mode.

As shown in FIG. 3, the access point 110 buffers data to be transmitted to the STA 120-1, 120-2, 120-N operating in the sleep mode, wherein the data is transmitted in a beacon signal. The access point 110 periodically transmits the beacon signal in order to transmit a frame being buffered to the STA 120-1, 120-2, 120-N operating in the sleep mode.

Information indicating a buffered frame is contained in the traffic indication message and is transmitted with a beacon frame to the STA 120-1, 120-2, 120-N within a coverage range. TIM refers to an information filed transmitted by the beacon frame at the access point 110 in 802.11 of a wireless LAN standard.

The access point 110 transmits the beacon signal again to the surrounding STA 120-1, 120-2, 120-N. The STA 120-1, 120-2, 120-N operates in the sleep mode bases on the data transfer type contained in the beacon signal received from the access point 110.

The access point 110 transmits the beacon signal again to the surrounding STA 120-1, 120-2, 120-N in a predetermined period. The STA 120-1, 120-2, 120-N maintains operation in the sleep mode according to the data transfer type contained in the beacon signal received from the access point 110.

The STA 120-1, 120-2, 120-N periodically enters the sleep mode from the wake-up state to receive a beacon signal from the access point 110. The STA 120-1, 120-2, 120-N analyzes the beacon signal to determine a period of receiving broadcast/multicast data.

The STA 120-1, 120-2, 120-N identifies a delivery traffic indication message (DTIM) of a beacon signal. The DTIM refers to parameters of transmission contained in a TIM.

When the access point 110 specifies parameters contained in the DTIM, the STA 120-1, 120-2, 120-N operates by complying with the parameters contained in the DTIM.

Figure 4A:
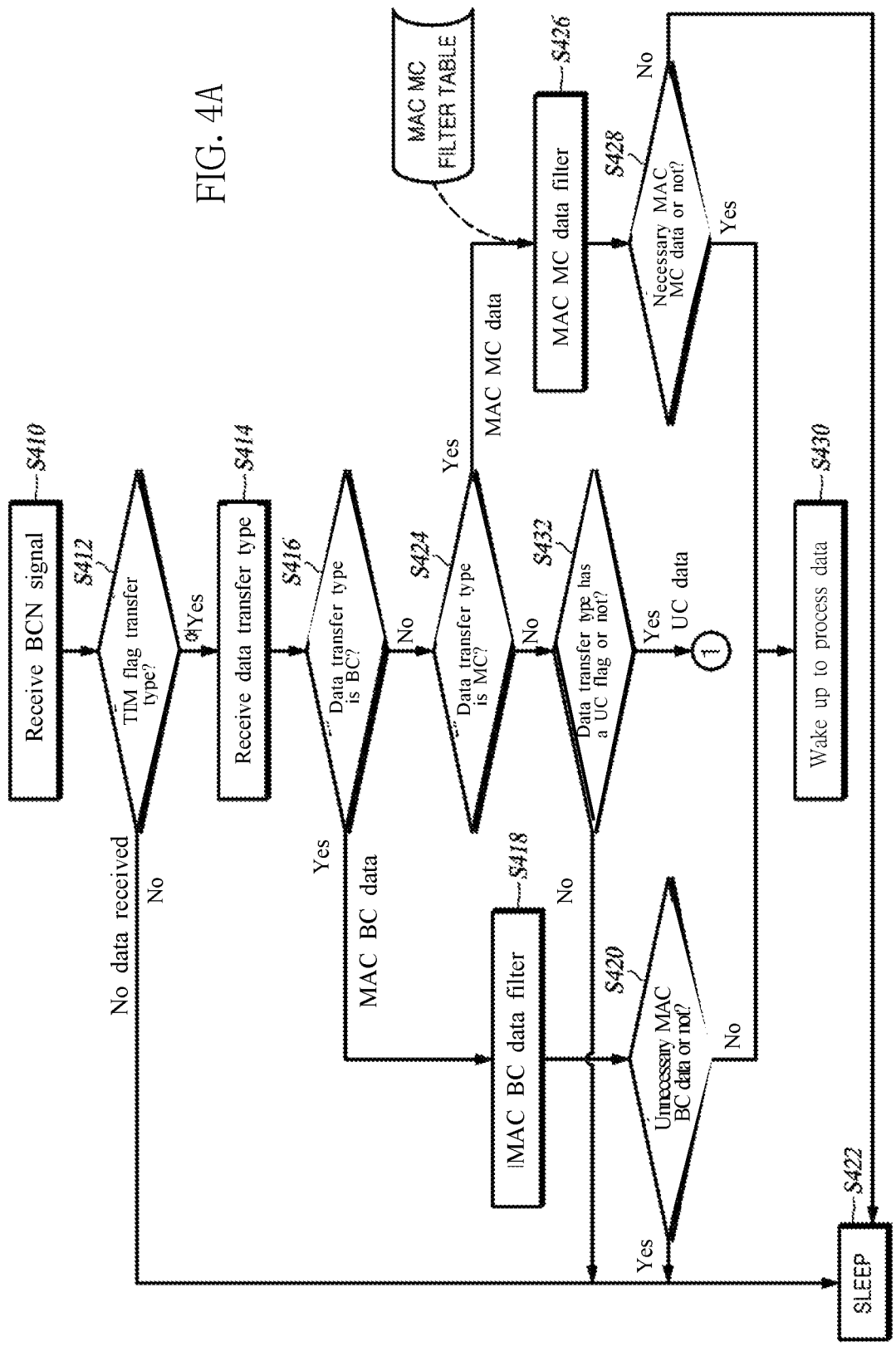
FIGS. 4A and 4B both show flowcharts of a filtering system for reducing wake-up frequency in accordance with an embodiment of the present invention.
Figure 4B:
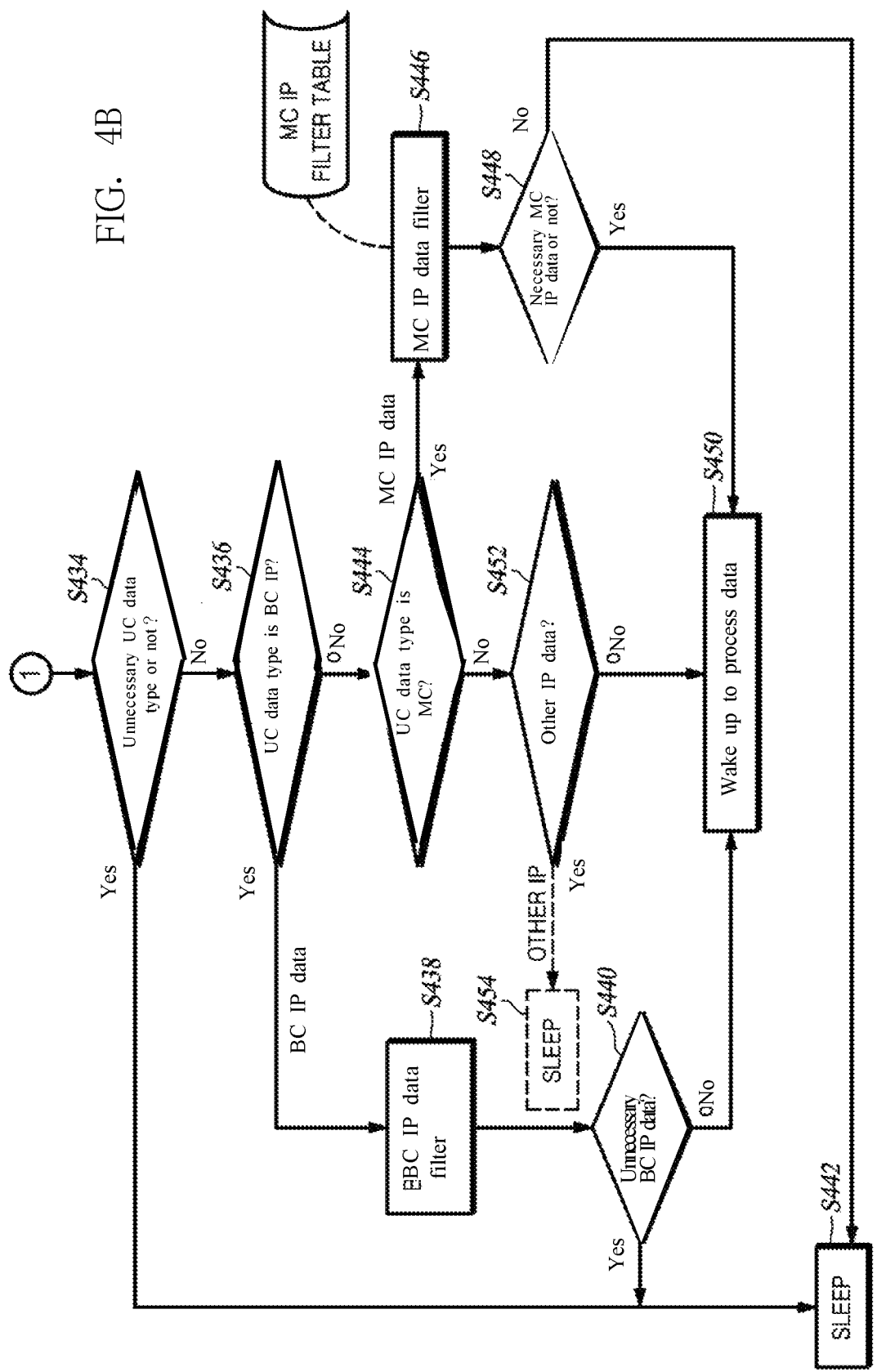

FIGS. 4A and 4B both show flowcharts of a filtering system for reducing wake-up frequency in accordance with an embodiment of the present invention. The STA 120-1, 120-2, 120-N utilizes the beacon receiver program 130-1, 130-2, 130-N to periodically receive a beacon signal from the access point 110 (S410).

The STA 120-1, 120-2, 120-N utilizes the beacon receiver program 130-1, 130-2, 130-N to identify an information element of data contained in the beacon signal. The STA 120-1, 120-2, 120-N utilizes the beacon receiver program 130-1, 130-2, 130-N to identify a traffic indication message contained in the information element, and to determine whether to identify a data transfer type in the traffic indication message (S412).

According to an identification result in the step S412, when the data transfer type is not identified, the STA 120-1, 120-2, 120-N utilizes the beacon receiver program 130-1, 130-2, 130-N to operate in the sleep mode (S422).

In the step S422, when the data transfer type in the traffic indication message is not identified, the STA 120-1, 120-2, 120-N operates in the sleep mode turning off part or all of modules of hardware and software necessary for communication with the access point.

According to an identification result in the step S412, when the data transfer type is identified, the STA 120-1, 120-2, 120-N utilizes the beacon receiver program 130-1, 130-2, 130-N to receive the data transfer type in the traffic indication message (S414).

The STA 120-1, 120-2, 120-N utilizes the beacon receiver program 130-1, 130-2, 130-N to identify a flag of the data transfer type and whether the flag is a broadcast/multicast flag or a unicast flag.

The STA 120-1, 120-2, 120-N utilizes the beacon receiver program 130-1, 130-2, 130-N to identify whether the data transfer type has the broadcast flag (S416).

In the step S416, broadcast and multicast both have the same flag. Therefore, the STA 120-1, 120-2, 120-N operates by assuming that the data transfer type is broadcast.

According to an identification result in the step S416, when the data transfer type has the broadcast flag, the STA 120-1, 120-2, 120-N utilizes the beacon receiver program 130-1, 130-2, 130-N to import the MAC broadcast filter 242 (S414).

A beacon signal contains more data for maintaining network connectivity in WLAN. MAC data is data for maintaining or controlling network connectivity in 802.11 WLAN. However, MAC data is likely to contain unnecessary data which is capable of being identified.

The STA 120-1, 120-2, 120-N utilizes the MAC broadcast filter 242 to identify whether the data with the broadcast/multicast flag is unnecessary data (S420).

According to an identification result in the step S420, when the data with the broadcast/multicast flag is identified as unnecessary data, the STA 120-1, 120-2, 120-N utilizes the beacon receiver program 130-1, 130-2, 130-N to operate in the sleep mode (S422).

In the step S422, when the data with the broadcast/multicast flag is filtered by the MAC broadcast filter 242, the STA 120-1, 120-2, 120-N operates in the sleep mode turning off part or all of modules of hardware and software necessary for communication with the access point 110.

According to an identification result in the step S420, when the data with the broadcast flag is identified as necessary data, the STA 120-1, 120-2, 120-N utilizes the beacon receiver program 130-1, 130-2, 130-N to operate in the active mode (S430).

According to an identification result in the step S416, when the data transfer type does not have the broadcast flag, the STA 120-1, 120-2, 120-N utilizes the beacon receiver program 130-1, 130-2, 130-N to identify whether the data transfer type has the multicast flag (S424).

In the step S424, broadcast and multicast both have the same flag. Therefore, the STA 120-1, 120-2, 120-N operates by assuming that the data transfer type is multicast.

In the step S424, when the data transfer type has the multicast flag, the STA 120-1, 120-2, 120-N utilizes the beacon receiver program 130-1, 130-2, 130-N to import the MAC multicast filter 243 (S426).

The STA 120-1, 120-2, 120-N utilizes the MAC multicast filter 243 to identify whether the data with the multicast flag is unnecessary data (S428).

According to an identification result in the step S428, when the data with the multicast flag is identified as unnecessary data, the STA 120-1, 120-2, 120-N utilizes the beacon receiver program 130-1, 130-2, 130-N to operate in the sleep mode (S422).

In the step S422, when the data with the multicast flag is filtered by the MAC multicast filter 243, the STA 120-1, 120-2, 120-N operates in the sleep mode turning off part or all of modules of hardware and software necessary for communication with the access point 110.

According to an identification result in the step S428, when the data with the multicast flag is identified as necessary data, the STA 120-1, 120-2, 120-N utilizes the beacon receiver program 130-1, 130-2, 130-N to operate in the active mode (S430).

According to an identification result in the step S424, when the data transfer type is not the broadcast/multicast flag, the STA 120-1, 120-2, 120-N utilizes the beacon receiver program 130-1, 130-2, 130-N to identify whether the data transfer type has the unicast flag (S432).

Because the unicast data is application program data, the unicast data cannot be controlled.

According to an identification result in the step S432, when the data transfer type is not the unicast flag, the STA 120-1, 120-2, 120-N utilizes the beacon receiver program 130-1, 130-2, 130-N to operate in the sleep mode (S422).

In the step S422, when the STA 120-1, 120-2, 120-N utilizes the beacon receiver program 130-1, 130-2, 130-N to identify that the data transfer type is not the broadcast/multicast or unicast flag, the STA 120-1, 120-2, 120-N operates in the sleep mode turning off part or all of modules of hardware and software necessary for communication with the access point 110.

According to an identification result in the step S432, when the data transfer type is the unicast flag, the STA 120-1, 120-2, 120-N utilizes the beacon receiver program 130-1, 130-2, 130-N to identify whether the data with the unicast flag is unnecessary data (S434).

In the step S434, when the STA 120-1, 120-2, 120-N utilizes the beacon receiver program 130-1, 130-2, 130-N to identify that the data transfer type has the unicast flag, the STA 120-1, 120-2, 120-N utilizes the MAC unicast filter 244 to identify whether the data with the unicast flag is unnecessary data.

In the step S434, when the data with the unicast flag is identified as necessary data, the STA 120-1, 120-2, 120-N utilizes the beacon receiver program 130-1, 130-2, 130-N to identify whether the data with the unicast flag is broadcast IP data (S436).

In the step S436, when the data with the unicast flag is the broadcast IP data, the STA 120-1, 120-2, 120-N utilizes the beacon receiver program 130-1, 130-2, 130-N to import the broadcast IP filter 245 (S438).

The STA 120-1, 120-2, 120-N utilizes the beacon receiver program 130-1, 130-2, 130-N and the broadcast IP filter 245 to identify whether the broadcast IP data is unnecessary data (S440).

In the step S440, when the broadcast IP data is filtered by the broadcast IP data filter 245, the STA 120-1, 120-2, 120-N operates in the sleep mode turning off part or all of modules of hardware and software necessary for communication with the access point 110 (S442).

In the step S440, when the broadcast IP data is not filtered by the broadcast IP data filter 245, the STA 120-1, 120-2, 120-N operates in the active mode turning on part or all of modules of hardware and software necessary for communication with the access point 110 (S450).

According to an identification result in the step S436, when the data with the unicast flag is not broadcast IP data, the STA 120-1, 120-2, 120-N utilizes the beacon receiver program 130-1, 130-2, 130-N to identify whether the data with the unicast flag is multicast IP data (S444).

According to an identification result in the step S444, when the data with the unicast flag is the multicast IP data, the STA 120-1, 120-2, 120-N utilizes the beacon receiver program 130-1, 130-2, 130-N to import the multicast IP filter 246 (S446).

The STA 120-1, 120-2, 120-N utilizes the beacon receiver program 130-1, 130-2, 130-N and the multicast IP filter 246 to identify whether the multicast IP data is unnecessary data (S448).

According to an identification result in the step S448, when the multicast IP data is filtered by the multicast IP filter 246, the STA 120-1, 120-2, 120-N utilizes the beacon receiver program 130-1, 130-2, 130-N to operate in the sleep mode turning off part or all of modules of hardware and software necessary for communication with the access point 110 (S442).

According to an identification result in the step S448, when the multicast IP data is not filtered by the multicast IP filter 246, the STA 120-1, 120-2, 120-N utilizes the beacon receiver program 130-1, 130-2, 130-N to operate in the active mode turning on part or all of modules of hardware and software necessary for communication with the access point 110 (S450).

According to an identification result in the step S444, when the data with the unicast flag is not the multicast IP data, the STA 120-1, 120-2, 120-N utilizes the beacon receiver program 130-1, 130-2, 130-N to identify whether the data with the unicast flag is filtered by the other IP filter 247 (S452).

According to an identification result in the step S452, when the data with the unicast flag is filtered by the other IP filter 247, the STA 120-1, 120-2, 120-N utilizes the beacon receiver program 130-1, 130-2, 130-N to operate in the sleep mode turning off part or all of modules of hardware and software necessary for communication with the access point 110 (S454).

According to an identification result in the step S452, when the data with the unicast flag is not filtered by the other IP filter 247, the STA 120-1, 120-2, 120-N utilizes the beacon receiver program 130-1, 130-2, 130-N to operate in the active mode turning on part or all of modules of hardware and software necessary for communication with the access point 110 (S450).

The steps S410 to S454 as shown in FIGS. 4A and 4B are performed in order, but are not limited thereto. That is, an order of how to perform the steps is variable or at least more than one of the steps are performed concurrently. Therefore, FIGS. 4A and 4B are not to limited to a sequential order.

A filtering method of reducing wake-up frequency in accordance with the embodiment of the present invention as illustrated in FIGS. 4A and 4B is implemented by a program and is recorded in a computer readable medium. Programs for implementing the filtering method of reducing wake-up frequency of the present invention are recorded in the computer readable medium. The computer readable medium comprises all kinds of recording apparatus storing data which is readable by a computer system.

Figure 5:
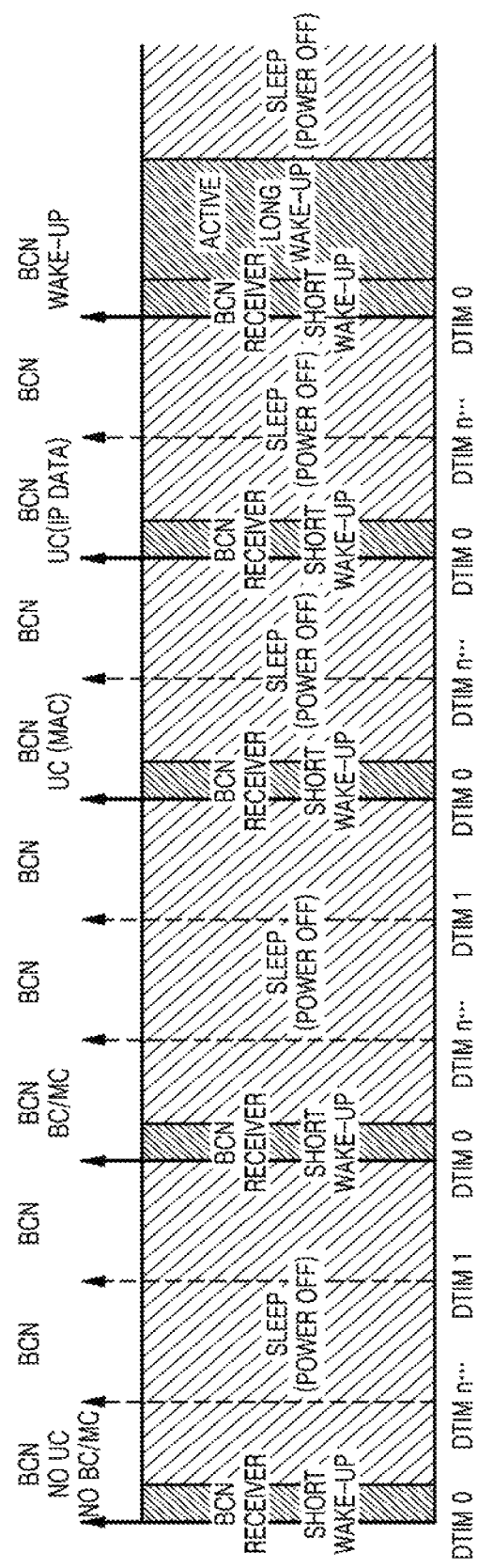
FIG. 5 is a diagram showing a method of processing a beacon signal according to a necessary information element in accordance with an embodiment of the present invention.

FIG. 5 is a diagram showing a method of processing a beacon signal according to a necessary information element in accordance with an embodiment of the present invention.

As shown in FIG. 5, the STA 120-1, 120-2, 120-N is installed with the beacon receiver program 130-1, 130-2, 130-N to identify necessary data. The STA 120-1, 120-2, 120-N utilizes the beacon receiver program 130-1, 130-2, 130-N to filter unnecessary broadcast of MAC, thereby to reduce wake-up frequency of the STA.

The STA 120-1, 120-2, 120-N utilizes the beacon receiver program 130-1, 130-2, 130-N to filter unnecessary multicast of MAC, thereby to reduce wake-up frequency of the STA. The STA 120-1, 120-2, 120-N additionally includes a multicast table in use with the beacon receiver program 130-1, 130-2, 130-N to process necessary multicast data. The STA 120-1, 120-2, 120-N utilizes the beacon receiver program 130-1, 130-2, 130-N to filter unnecessary unicast of MAC, thereby to reduce wake-up frequency of the STA.

The STA 120-1, 120-2, 120-N utilizes the beacon receiver program 130-1, 130-2, 130-N to filter unnecessary IP data in the unicast data transfer type to reduce wake-up frequency of the system. When the data transfer type is unicast and is not a corresponding IP of an STA, the STA 120-1, 120-2, 120-N utilizes the beacon receiver program 130-1, 130-2, 130-N to filter it to reduce wake-up frequency of the STA.

The STA 120-1, 120-2, 120-N utilizes the beacon receiver program 130-1, 130-2, 130-N to identify that CHECKER is an element for checking necessary information, and thus is defined as an information element contained in the beacon signal.

The STA 120-1, 120-2, 120-N utilizes the beacon receiver program 130-1, 130-2, 130-N to identify a traffic indication message of the information element contained in the beacon signal. The STA 120-1, 120-2, 120-N utilizes the beacon receiver program 130-1, 130-2, 130-N to identify a data transfer type of the traffic indication message of the information element.

The STA 120-1, 120-2, 120-N identifies a data transfer type contained in the beacon signal periodically received from the access point 110. The STA 120-1, 120-2, 120-N identifies whether the data transfer type contained in the beacon signal is broadcast/multicast or unicast, and is changed to the wake-up state from the sleep mode according to whether it is necessary data.

The STA 120-1, 120-2, 120-N shortly wakes up from the sleep mode to receive a current beacon signal from the access point 110.

The STA 120-1, 120-2, 120-N in a shortly wake-up state receives a beacon signal from the access point 110 and identifies a data transfer type contained in the beacon signal, and further identifies whether there is necessary data contained in data corresponding to a specific data transfer type.

When the data corresponding to a specific data transfer type is necessary data as shown in FIG. 5, the STA 120-1, 120-2, 120-N shortly wakes up part or all of modules of hardware and software necessary for communication with the access point 110 to process data contained in the beacon signal.

When the data corresponding to a specific data transfer type is necessary data as shown in FIG. 5, the STA 120-1, 120-2, 120-N long wakes up part or all of modules of hardware and software necessary for communication with the access point 110 to process data contained in the beacon signal.

It is understood that the invention may be embodied in other forms within the scope of the claims. Thus the present examples and embodiments are to be considered in all respects as illustrative, and not restrictive, of the invention defined by the claims.

What is claimed is:

1. A beacon signal processing system comprising a memory and a processor, wherein a beacon receiver program containing computerized instructions is stored in the memory and configured to be executed by the processor to perform a method, the method comprising:
   periodically receiving, by a beacon receiver, a beacon signal from an access point;
   identifying an information element of data contained in the beacon signal;
   identifying a data transfer type of a traffic indication message contained in the information element;
   determining that data contained in the beacon signal is effective data when the data transfer type is corresponding to a specific data transfer type;
   identifying whether the effective data is necessary data according to a flag corresponding to the specific data transfer type; and
   operating in a sleep mode when the effective data is identified as the unnecessary data and operating in an active mode when the effective data is identified as the necessary data.

2. The beacon signal processing system of claim 1 wherein the beacon receiver program executed by the processor identifies whether a flag of the data transfer type is a broadcast flag, a multicast flag, or a unicast flag, and when the flag of the data transfer type is the broadcast flag, the multicast flag, or the unicast flag, the data contained in the beacon signal is the effective data corresponding to the specific data transfer type.

3. The beacon signal processing system of claim 2, wherein when the data transfer type has the broadcast flag/the multicast flag, the beacon receiver program executed by the processor utilizes a media access control (MAC) broadcast filter to identify whether data with the broadcast flag/the multicast flag is unnecessary data.

4. The beacon signal processing system of claim 3, wherein when the data with the broadcast flag/the multicast flag is filtered by the MAC broadcast filter, the processor operates in the sleep mode turning off part or all of modules of hardware and software necessary for communication with the access point; and when the data with the broadcast flag/the multicast flag is not filtered by the MAC broadcast filter, the processor operates in the active mode turning on part or all of modules of hardware and software necessary for communication with the access point.

5. The beacon signal processing system of claim 2, wherein when the data transfer type has the broadcast flag/the multicast flag, the processor utilizes a MAC multicast filter to identify whether data with the broadcast flag/the multicast flag is unnecessary data.

6. The beacon signal processing system of claim 5, wherein when the data with the broadcast flag/the multicast flag is filtered by the MAC multicast filter, the processor operates in the sleep mode turning off part or all of modules of hardware and software necessary for communication with the access point; and when the data with the broadcast flag/the multicast flag is not filtered by the MAC multicast filter, the processor operates in the active mode turning on part or all of modules of hardware and software necessary for communication with the access point.

7. The beacon signal processing system of claim 2, wherein when the data transfer type has the unicast flag, the filtering unit utilizes a MAC unicast filter to identify whether data with the unicast flag is unnecessary data.

8. The beacon signal processing system of claim 7, wherein when the data with the unicast flag is filtered by the MAC unicast filter, the processor operates in the sleep mode turning off part or all of modules of hardware and software necessary for communication with the access point.

9. The beacon signal processing system of claim 7, wherein when the data with the unicast flag is not filtered by the MAC unicast filter, the processor identifies that the data with the unicast flag is necessary data and further identifies whether the unicast flag is a broadcast/multicast Internet protocol (IP) flag or other flags, and when the unicast flag is identified as not the IP flag or the other flags, the data with the unicast flag is identified as the effective data.

10. The beacon signal processing system of claim 7, wherein when the data with the unicast flag has the broadcast/multicast IP flag, the processor utilizes a broadcast IP filter to identify whether the data with the broadcast/multicast IP flag is unnecessary data.

11. The beacon signal processing system of claim 10, wherein when the data with the broadcast/multicast IP flag is filtered by the broadcast IP filter, the processor operates in the sleep mode turning off part or all of modules of hardware and software necessary for communication with the access point; and when the data with the broadcast/multicast IP flag is not filtered by the broadcast IP filter, the processor operates in the active mode turning on part or all of modules of hardware and software necessary for communication with the access point.

12. The beacon signal processing system of claim 7, wherein when the data with the unicast flag has the broadcast/multicast IP flag, the processor utilizes a multicast IP filter to identify whether the data with the broadcast/multicast IP flag is unnecessary data.

13. The beacon signal processing system of claim 12, wherein when the data with the broadcast/multicast IP flag is filtered by the multicast IP filter, the processor operates in the sleep mode turning off part or all of modules of hardware and software necessary for communication with the access point; and when the data with the broadcast/multicast IP flag is not filtered by the multicast IP filter, the processor operates in the active mode turning on part or all of modules of hardware and software necessary for communication with the access point.

14. The beacon signal processing system of claim 7, wherein the processor utilizes another IP filter to identify whether the data with the unicast flag is unnecessary data.

15. The beacon signal processing system of claim 14, wherein when the data with the unicast IP flag is filtered by the other IP filter, the processor operates in the sleep mode turning off part or all of modules of hardware and software necessary for communication with the access point; and when the data with the unicast IP flag is not filtered by the other IP filter, the processor operates in the active mode turning on part or all of modules of hardware and software necessary for communication with the access point.

16. The beacon signal processing system of claim 1, wherein the beacon receiver program stored in the memory comprises a filtering unit, the filtering unit comprising:
   a media access control (MAC) broadcast filter provided to filter unnecessary MAC broadcast data;
   a MAC multicast filter provided to filter unnecessary MAC multicast data;
   a MAC unicast filter provided to filter unnecessary MAC unicast data;
   a broadcast IP filter provided to filter unnecessary broadcast IP data;
   a multicast IP filter provided to filter unnecessary multicast IP data; and
   another IP filter provided to filter other IP.

17. A filtering method of reducing wake-up frequency, adapted for an electronic device, the filtering method comprising:
   periodically receiving a beacon signal from an access point;
   identifying an information element of data contained in the beacon signal;
   identifying a traffic indication message contained in the information element, and identifying a data transfer type of the traffic indication message;
   determining that data contained in the beacon signal is effective data when the data transfer type is corresponding to a specific data transfer type;
   identifying whether the effective data is necessary data according to a flag corresponding to the specific data transfer type; and
   operating in a sleep mode when the effective data is identified as the unnecessary data and operating in an active mode when the effective data is identified as the necessary data.

* * * * *